United States Patent [19]

Tateoka et al.

[11] 4,418,611
[45] Dec. 6, 1983

[54] PNEUMATIC SERVO BOOSTER

[75] Inventors: Kiyoshi Tateoka, Fujisawa; Yoshihiro Hayashida, Chigasaki, both of Japan

[73] Assignee: Tokico Ltd., Kawasaki, Japan

[21] Appl. No.: 392,141

[22] Filed: Jun. 25, 1982

Related U.S. Application Data

[63] Continuation of Ser. No. 170,876, Jul. 21, 1980, abandoned.

[30] Foreign Application Priority Data

Jul. 20, 1979 [JP] Japan .................................. 54-101243

[51] Int. Cl.³ .............................................. F15B 9/10
[52] U.S. Cl. ................................ 91/369 A; 96/98 D; 96/165 PR; 96/166
[58] Field of Search ................ 92/98 D, 165 PR, 166, 92/99, 102, 168; 91/369 A; 60/547.1, 581

[56] References Cited

U.S. PATENT DOCUMENTS 3,002,499 10/1961 Schultz ................................. 92/99
4,256,016 3/1981 Thomas ............................ 91/369 A
4,270,353 6/1981 Thomas ................................ 60/581

OTHER PUBLICATIONS

Wagner Electric Corporation (Wagner) pp. 1-2, Apr. 1978.

*Primary Examiner*—Abraham Hershkovitz
*Attorney, Agent, or Firm*—Wenderoth, Lind & Ponack

[57] ABSTRACT

A pneumatic servo booster including a shell housing having front and rear shells, a valve body incorporating therein, a valve mechanism slidably supported by the rear shell, a partitioning member cooperating with the valve body for partitioning the interior of the shell housing into front and rear chambers, and a connecting rod axially extending in the front and rear directions through the front and rear chambers and through the partitioning member with the opposite ends thereof being connected to respective shells. An annular tubular extendable member is provided for surrounding a portion of the connecting rod. One end of the tubular member is connected to the peripheral surface of a bore which is formed in the partitioning member for passing therethrough the connecting rod, and the other end of the tubular member is connected to either the front or rear shell and surrounds the connecting rod.

3 Claims, 1 Drawing Figure

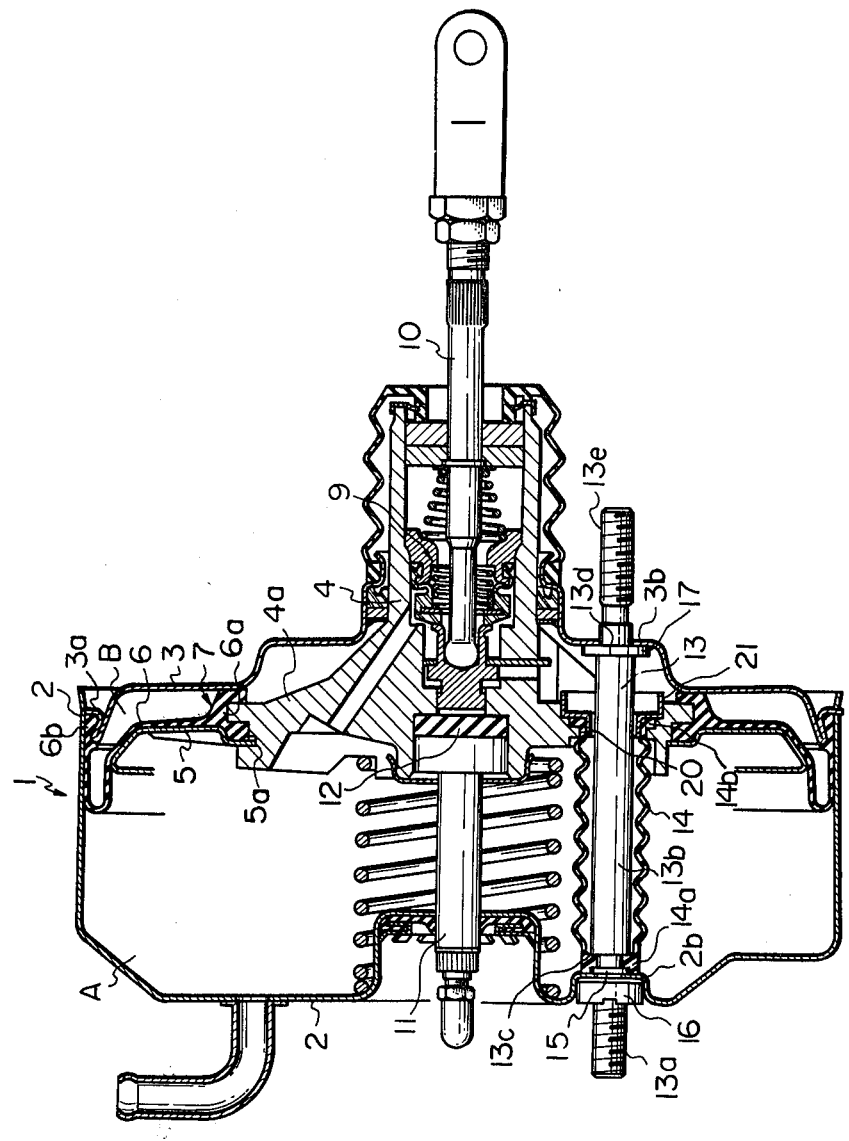

PNEUMATIC SERVO BOOSTER

This application is a continuation of application Ser. No. 170,876, filed July 21, 1980 now abandoned.

BACKGROUND OF THE INVENTION

This invention relates to pneumatic servo boosters and, particularly, to pneumatic servo boosters of the kind including a shell housing comprising a front and rear shell, a valve body incorporating therein a valve mechanism and being slidably supported by the rear shell, and a partitioning member cooperating with the valve body for partitioning the interior of the shell housing into front and rear chambers.

Pneumatic servo boosters of the kind aforementioned are widely used in vehicle hydraulic braking system and, usually, a master cylinder is connected to the front shell, and the master cylinder and the servo booster are mounted on a toe-board, which partitions the driver's room of a vehicle from the engine compartment, by a plurality of bolts secured to the rear shell of the servo booster. In such case, the force acting on the master cylinder in generating hydraulic pressure in the master cylinder by e.g. depressing a brake pedal is transmitted to the toe-board through the front and rear shells. When the strength of the shell housing is not adequate for preventing the shell housing from deforming due to the force acting on the master cylinder, the shell housing will be deformed, thereby decreasing the effective stroke of the servo booster.

The aforementioned problem can be solved by increasing the thickness of the front and rear shells or by using stronger material for the shell housing; however, either of these solutions will increase the cost of the shell housing.

There has been proposed providing at least one, preferably two or three, connecting rods in the shell housing extending through the front and rear chambers and through the partitioning member with the opposite ends thereof being connected respectively to front and rear shells. The connecting rod can effectively transmit the force acting on the master cylinder to the rear shell and, accordingly, to the toe-board, thereby minimizing the deformation of the shell housing.

The connecting rod passes through the partitioning member and is displaceable relative thereto; thus, there is another problem in that it is difficult to have an effective seal between the connecting rod and the partitioning member.

SUMMARY OF THE INVENTION

One of the objects of the present invention is to provide a hydraulic servo booster solving the aforementioned problems and, according to the invention, an annular tubular extensible member is provided for surrounding a portion of the connecting rod. One end of the tubular member is connected to the peripheral edges of a bore which is formed in the partitioning member for passing therethrough the connecting rod, and the other end of the tubular member is connected to either the front or rear shell.

Preferably, according to the preferred embodiment, the tubular member is a bellows type member formed of resilient material, and one end of the tubular member is sealingly connected to the bore of the partitioning member, and the connecting rod loosely passes through the tubular member one end. The other end of the tubular member is sealingly connected to the front shell and to the connecting rod.

BRIEF DESCRIPTION OF THE DRAWING

The invention will hereinafter be explained in detail in conjunction with the accompanying drawing showing one preferred embodiment of the invention, in which:

The single drawing is a sectional view of a pneumatic servo booster according to the present invention, the upper half thereof showing the vertical cross-section and the lower half thereof the horizontal cross-section.

DETAILED DESCRIPTION OF THE PREFERRED EMBODIMENTS

The pneumatic servo booster shown in the drawing comprises a shell housing 1 comprising a front shell 2 and a rear shell 3, and a valve body 4 having a cylindrical portion and a radially extending flange portion 4a. The valve body 4 is slidably supported by the rear shell 3 and has a piston plate 5 mounted on the outer circumference thereof. A flexible diaphragm 6 is bonded to the piston plate 5 and surrounds the valve body 4 and extends from the outer circumference of the valve body 4 to the inner peripheral wall of the shell housing 1. The flange portion 4a of the valve body 4, the piston plate 5 and the diaphragm 6 comprise a partitioning member 7 which partitions the interior of the shell housing 1 into a front chamber A and a rear chamber B. Incidentally, the flange portion 4a of the valve body 4 may be omitted with the piston plate 5 and the diaphragm 6 being connected to the outer circumference of cylindrically shaped valve body. In such a case, the piston plate and the diaphragm comprise the partitioning member.

The inner peripheral edge 5a of the piston plate 5 and the inner peripheral edge 6a of the diaphragm 6 are fitted to the valve body 4, and the outer peripheral edge 6b of the diaphragm 6 is clamped between respective end portions 2a and 3a of the front shell 2 and the rear shell 3. The valve body 4 incorporates a valve mechanism 9. The valve mechanism 9 is supported by the valve body 4 and is actuated by an input rod 10 which is connected to a brake pedal (not shown in the drawing) and moves forward (leftward as viewed in the drawing) when the brake pedal is depressed. An output rod 11 is provided in the front chamber A with the front end or the forward end thereof extending through the end wall or the side wall of the front shell 2 and being connected to a piston of a master cylinder which is not shown in the drawing and which is mounted on the front shell 2. The rear end of the output rod 11 is slidably fitted in an annular recess formed in the front end of the valve body 4 and receives the output force therefrom through a reaction disc 12. A pneumatic servo booster having the aforesaid construction is known to public.

However, additionally and according to the present invention there are provided two horizontally spaced connecting rods 13 (only one is shown in the drawing) which axially extend in the forward and rearward directions and pass through the front chamber A, the valve body 4 and the rear chamber B, with the front ends thereof being connected to the front shell 2 and the rear ends thereof being connected to the rear shell 3. Each connecting rod 13 includes a threaded portion 13a which outwardly projects from the front shell 2, a main body portion 13b, a shoulder portion 13c between the threaded portion 13a and the main body portion 13b, a threaded portion 13e on the rear end thereof and a shoulder portion 13d between the main body portion 13b and the threaded portion 13e. A washer 17 abuts the shoulder portion 13d and is welded to the inner wall of the rear shell 3 surrounding a through bore 3b which is formed in the rear shell 3 to pass through the threaded portion 13e therethrough. The threaded portion 13e also passes through the toe-board of the vehicle (not shown) and is rigidly connected thereto by a nut which rigidly connects the rear shell 3 with the connecting rod 13.

According to the preferred embodiment of the present invention, an annular extensible tubular member 14 is provided for surrounding a portion of the main body portion 13b with one end 14a thereof being connected to the front shell 2 and surrounding the connecting rod 13, and the other end 14b thereof connected to the peripheral edges of a bore 20 formed in the valve body 4 for loosely passing therethrough the connecting rod 13. The tubular member 14 is formed of a resilient material and is of a bellows type. The one end 14a of the tubular member 14 engages the shoulder 13c of the connecting rod 13 and also a washer 15 which abuts with the inner wall of the front shell 2 at the portion surrounding a through bore 2b of a front shell 2. The threaded portion 13a passes through the bore 2b and threadingly engages a nut 16. The nut 16 acts to clamp the end 14a of the tubular member 14 between the shoulder 13c of the connecting rod 13 and the washer 15 and, also, to rigidly connect the washer 15 with the inner wall of the front shell 2. The front end 14a of the tubular member acts to seal the annular space between the connecting rod 14 and the peripheral surface of the bore 2b of the front shell 2.

The other end 14b of the tubular member 14 is sealingly fitted in the bore 20 of the valve body 4 and is retained by a retaining ring 21. The tubular member 14 seals the chamber A from the chamber B, and the bellows-like shaped portion thereof assures smooth axial extension and contractions of the tubular member 14. The bellows-like shaped portion may not necessarily be provided along the entire length, and therefore, the bellows-like shaped portion may be provided along only a part of the length of the tubular member 14.

The seal between the connecting rod 14 and peripheral surface of the bore 3b of the rear shell 3 is effected by the washer 17 and the shoulder 13d of the connecting rod 13; thus, a small clearance may be formed between the connecting rod 13 and the peripheral surface of the bore 3b. However the pneumatic servo booster shown in the drawing acts between vacuum pressure and the atmospheric pressure, with the chamber A being permanently communicated with a source of vacuum pressure (not shown in the drawing) and the chamber B being selectively communicated with either the chamber A or the atmosphere. Thus, a small leak through the bore 3b of the rear shell 3 will not cause any serious problems. The threaded portions 13a of the connecting rods 13 are utilized to fixedly mount the master cylinder (not shown) on the servo booster and the threaded 13e of the connecting rods 13 are utilized to fixedly mount the servo booster on the toe-board of the vehicle.

In the preferred embodiment, the connecting rods 13 pass through the flange portion 14a of the valve body 4 comprising the partitioning member but, alternatively according to the present invention, the connecting rods 13 may pass through the piston plate 5 and the diaphragm 6.

There are provided two connecting rods 13 in the preferred embodiment, however according to the present invention, three or more connecting rods may be provided in a a circumferentially spaced relationship.

Moreover, in the preferred embodiment one end 14a of the tubular member 14 is sealingly secured to the front shell 2 and to the connecting rod 13, however according to the present invention one end of the tubular member may be sealingly secured to the rear shell 3 and to the connecting rod 13, and in such a case, the front end of the connecting rod is preferably welded to the front shell 2 so as to assure the sealed connection therebetween.

In use, the pneumatic servo booster according to the present invention is mounted on the body of a vehicle, and the valve body is displaced by depressing a brake pedal. The valve body displaces in the direction of the axis of the connecting rod. There are provided tubular extensible members between the partitioning member and respective connecting rods to seal the gaps therebetween, thus, as compared with a booster utilizing seals of a sliding contact type, an embodiment according to the present invention functions more effectively by preventing the wear of the seal and, accordingly, is more effective to prevent leakage. Further, since one end of the tubular member is utilized to seal the gap between the peripheral surface of one of the bores of the shells and the connecting rod, the number of seals utilized in the servo booster can be reduced.

The front and rear shells are connected by rigid connecting rods, thus, it is possible to prevent the deformation of the shells and to increase the durability of the servo booster. The force acting to deform the front and rear shells can substantially be reduced, thus, it is possible to reduce the thickness of the shells or to form the shells from a material such as a synthetic resin, thereby reducing the fabricating costs of the servo booster.

What is claimed is:

1. A pneumatic servo booster comprising:
    a shell housing having a front and rear shell;
    a valve body positioned inside said housing and slidably supported by said rear shell, said valve body having a valve mechanism therein;
    a partitioning member cooperating with said valve body for partitioning the interior space of said housing into a front and rear chamber, said partitioning member having a bore therethrough;
    a connecting rod axially extending through the front and rear chamber and freely extending through said bore, the rear end of said rod being welded to said rear shell and the front end of said rod extending through said front shell and being threaded;
    a nut threaded onto said front end of said rod;
    an integral tubular extensible member surrounding a portion of said rod, one end of said tubular member being sealingly attached to the peripheral edge of said bore and having the portion of the rod adjacent the rear end and within said rear shell passing freely through said tubular member, the other end of said tubular member being sealingly attached to said rod adjacent and within said front shell, said nut when tightened onto said rod drawing the forward end of said tubular member into sealing engagement with the inner surface of said front shell around the aperture in said front shell through which the front end of said rod extends.

2. A pneumatic servo booster as claimed in claim 1, wherein said tubular member is a bellows.

3. A pneumatic servo booster as claimed in claim 1, wherein:
    said rod has a shoulder; and
    said tubular member other end sealingly abuts a surface of said shoulder for sealing said tubular member to said rod.

* * * * *